(12) United States Patent
He et al.

(10) Patent No.: US 9,681,047 B2
(45) Date of Patent: Jun. 13, 2017

(54) IMAGE FEATURE EXTRACTION METHOD AND SYSTEM

(71) Applicants:Na He, Beijing (CN); Gang Wang, Beijing (CN); Zhongchao Shi, Beijing (CN); Dianchao Liu, Beijing (CN); Yaojie Lu, Beijing (CN)

(72) Inventors: Na He, Beijing (CN); Gang Wang, Beijing (CN); Zhongchao Shi, Beijing (CN); Dianchao Liu, Beijing (CN); Yaojie Lu, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 14/814,160

(22) Filed: Jul. 30, 2015

(65) Prior Publication Data

US 2016/0042244 A1 Feb. 11, 2016

(30) Foreign Application Priority Data

Aug. 7, 2014 (CN) .......................... 2014 1 0386817

(51) Int. Cl.
*H04N 5/232* (2006.01)
*G06K 9/46* (2006.01)
*H04N 5/262* (2006.01)

(52) U.S. Cl.
CPC ....... *H04N 5/23238* (2013.01); *G06K 9/4614* (2013.01); *H04N 5/2628* (2013.01)

(58) Field of Classification Search
USPC ...... 348/36, 42, 47, 49, 147, 43, 218.1, 294; 345/419, 629
See application file for complete search history.

(56) References Cited

U.S. PATENT DOCUMENTS

| 8,254,643 | B2 | 8/2012 | Shi et al. |
| 8,363,909 | B2 | 1/2013 | Guan et al. |
| 8,660,317 | B2 | 2/2014 | Li et al. |
| 2015/0169956 | A1 | 6/2015 | You et al. |
| 2015/0206004 | A1 | 7/2015 | Liang et al. |
| 2016/0314614 | A1* | 10/2016 | Bitterli ................. G06T 15/506 |

OTHER PUBLICATIONS

"Solid angle", [online] May 23, 2015, Wikipedia, Internet, <URL:https://en.wikipedia.org/wiki/Solid_angle>.
"Summed area table", [online] Feb. 10, 2015, Wikipedia, Internet, <URL:https://en.wikipedia.org/wiki/Integral_image>.

* cited by examiner

*Primary Examiner* — Bhavesh Mehta
*Assistant Examiner* — Narek Zohrabyan
(74) *Attorney, Agent, or Firm* — Harness, Dickey & Pierce, P.L.C.

(57) ABSTRACT

Disclosed is an image feature extraction method including a step of defining a combination of at least two kinds of solid angles along at least two directions, of an input spherical image; a step of determining respective values of the combination of the at least two kinds of solid angles, so that surface areas of spherical crowns of spherical segments, which are obtained by dividing the spherical image by the respective values of the combination of the at least two kinds solid angles, have a same value; and a step of generating, by utilizing the respective values of the combination of the at least two kinds of solid angles, an image feature template so as to conduct image feature extraction.

10 Claims, 14 Drawing Sheets

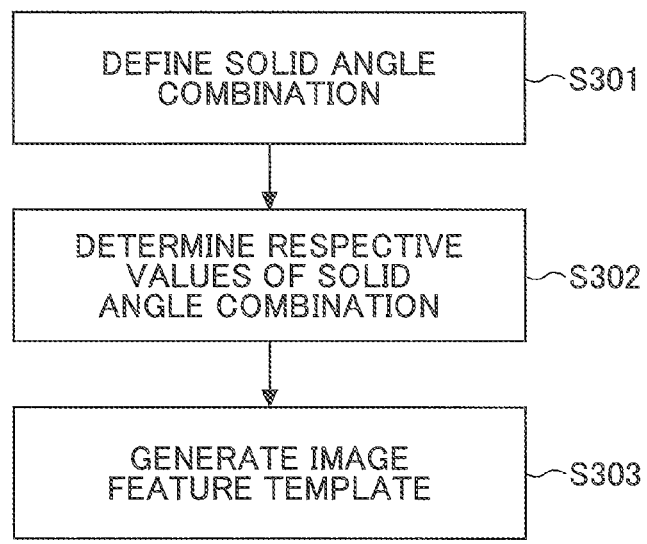
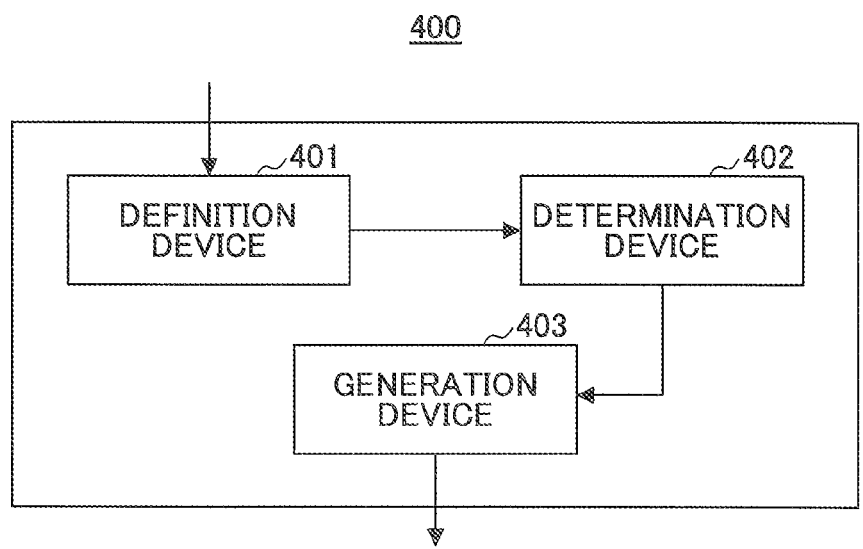

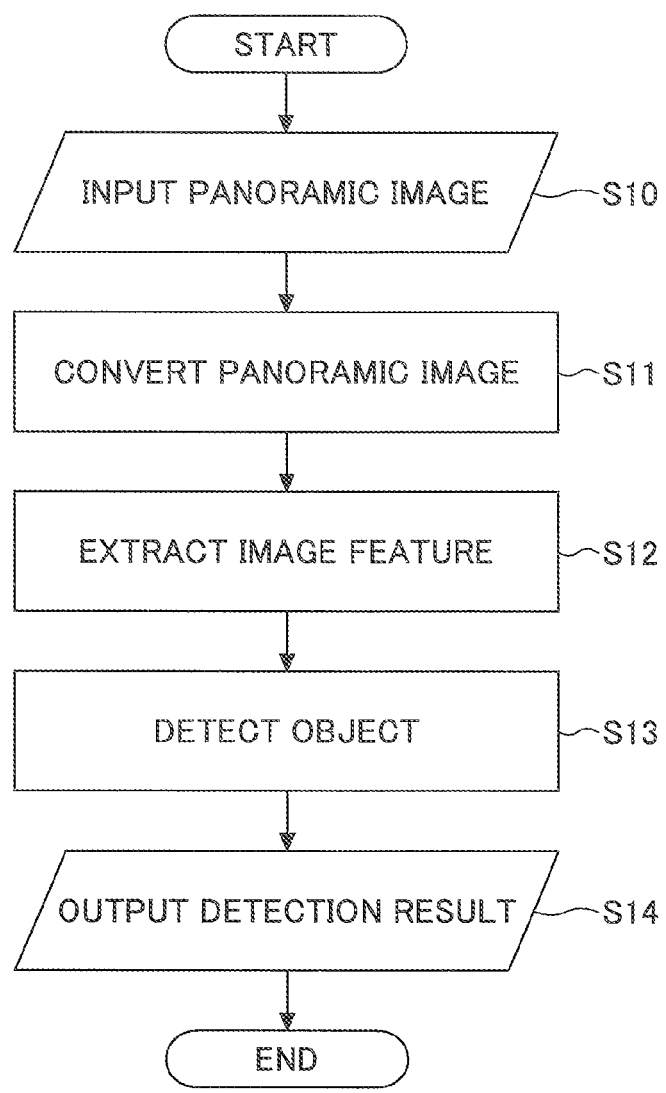

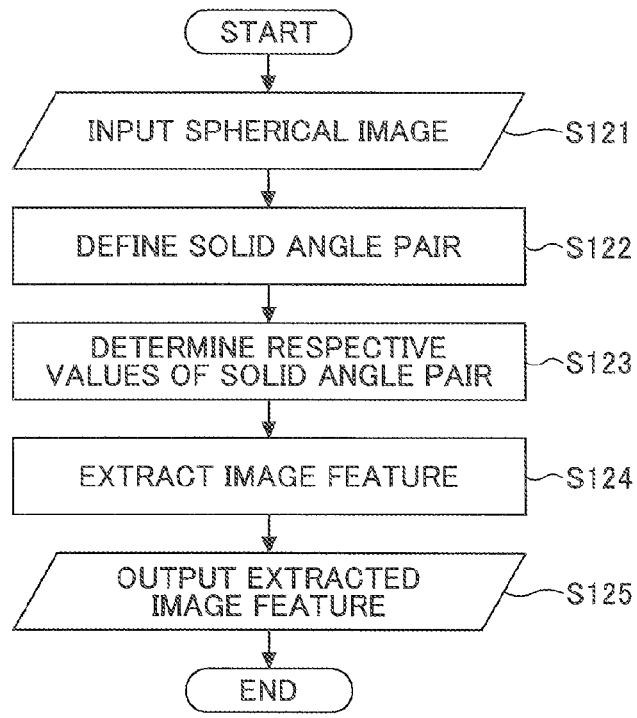
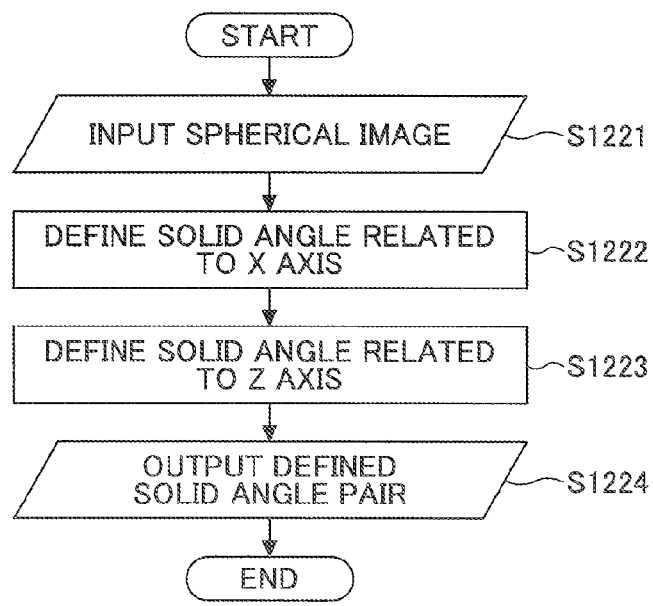

FIG.8B
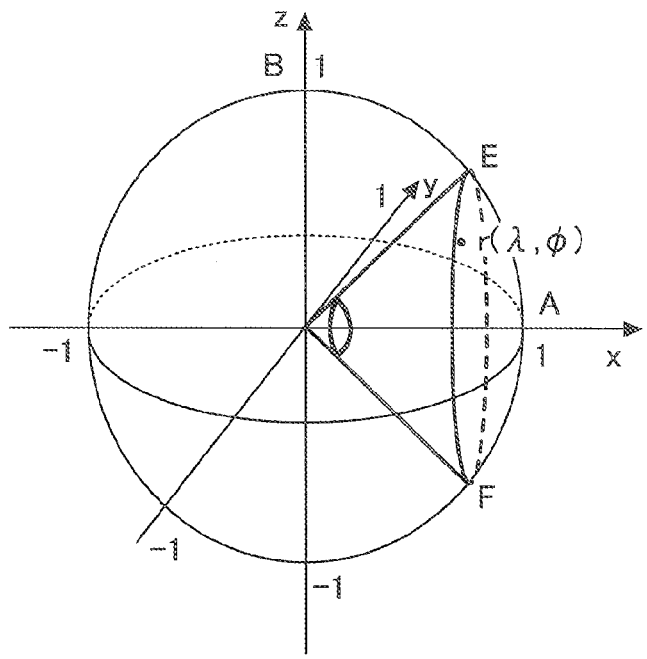
(a) SOLID ANGLE RELATED TO X AXIS
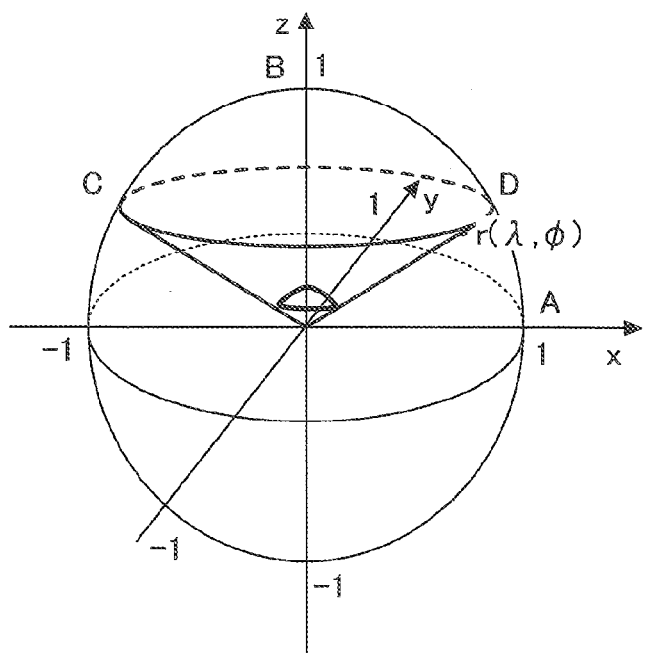
(b) SOLID ANGLE RELATED TO Z AXIS

UNIQUENESS

MONOTONICITY

FIG.9D
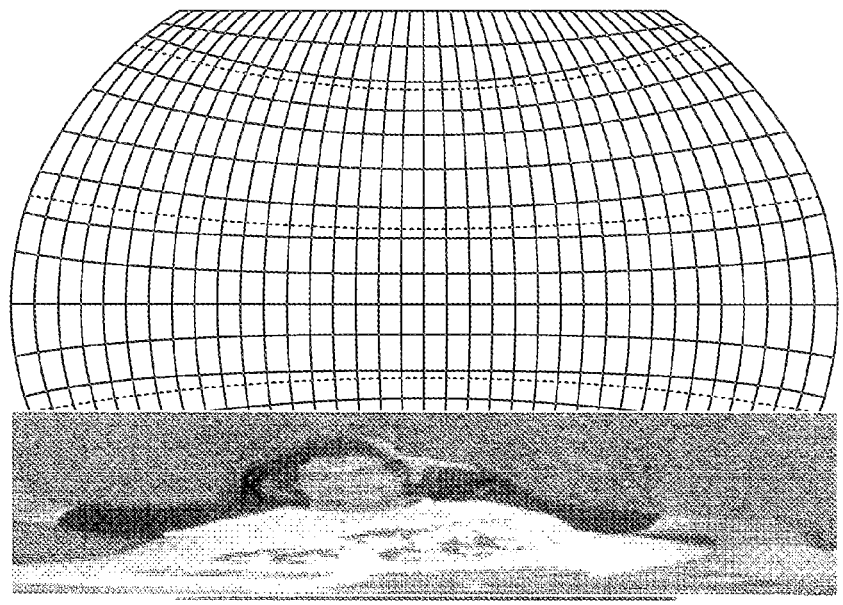
(a) LONGITUDE AND LATITUDE-BASED IMAGE OF PANORAMIC IMAGE
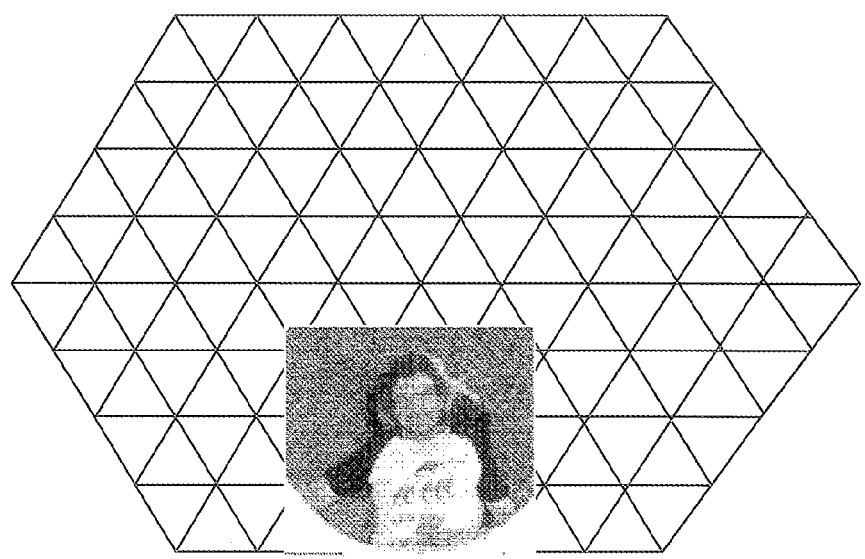
(b) IMAGE OBTAINED AFTER CONDUCTING SOLID ANGLE-BASED DIVISION

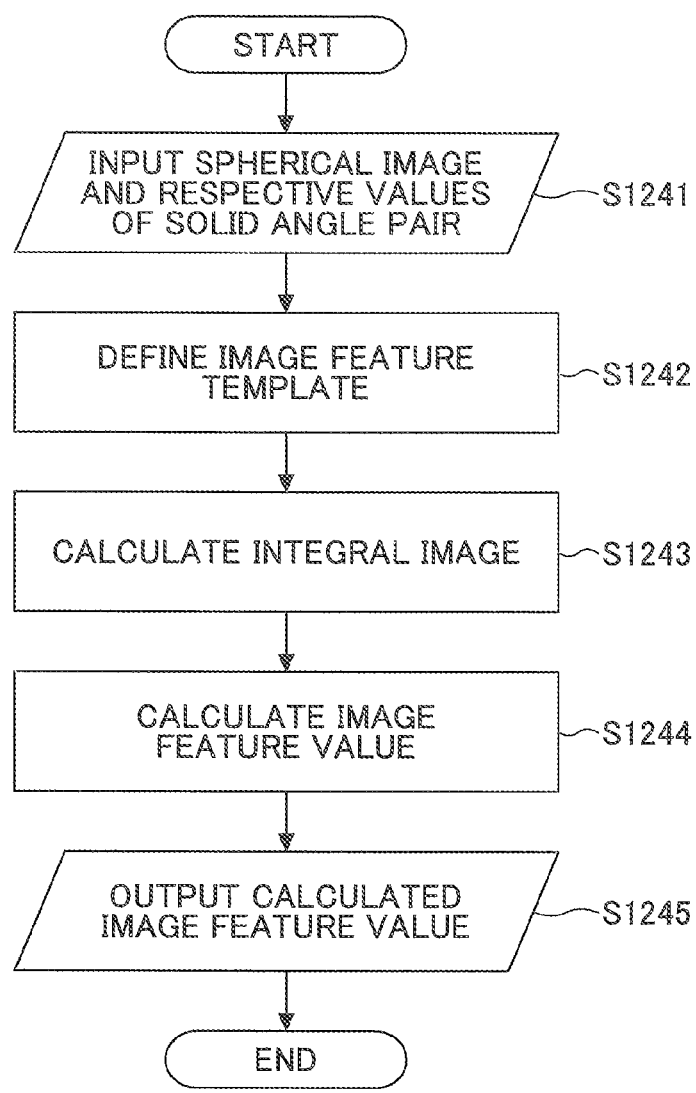

A: $I(x,y) - I(x+1,y)$

B: $I(x,y) - I(x,y-1)$

C: $I(x,y) - I(x+1,y) + I(x+2,y)$

D: $I(x,y) - I(x+1,y) - I(x,y+1) + I(x+1,y+1)$ $$ii(x,y) = \sum_{x' \leq x, y' \leq y} i(x',y')$$

↓ INTEGRAL IMAGE   ↓ ORIGINAL IMAGE $$ii(1) = \sum_{x' \leq x(1), y' \leq y(1)} i(x',y') = S(A)$$

$$ii(2) = \sum_{x' \leq x(2), y' \leq y(2)} i(x',y') = S(A+B)$$

$$ii(3) = \sum_{x' \leq x(3), y' \leq y(3)} i(x',y') = S(A+C)$$

$$ii(4) = \sum_{x' \leq x(4), y' \leq y(4)} i(x',y') = S(A+B+C+D)$$

THEN:
$S(D) = ii(1) + ii(4) - (ii(2) + ii(3))$

FIG.10D

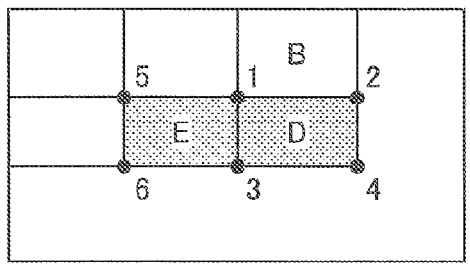 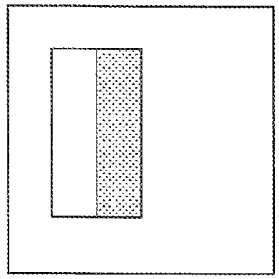

$$ii(x,y) = \sum_{x' \leq x, y' \leq y} i(x',y')$$

↓ INTEGRAL IMAGE ↓ ORIGINAL IMAGE $I(x,y) - I(x+step, y)$ $S(D) = ii(1) + ii(4) - (ii(2) + ii(3))$ $S(E) = ii(3) + ii(5) - (ii(1) + ii(6))$

FEATURE VALUE $= S(E) - S(D)$

FIG.10E

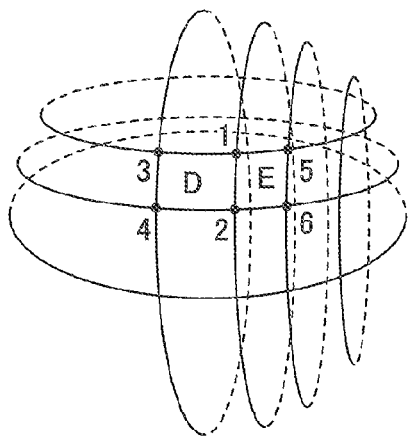 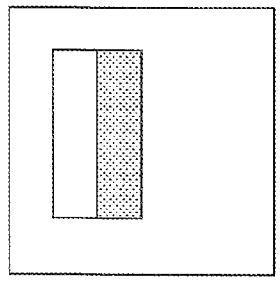

$$ii(\theta_x, \theta_z) = \sum_{\theta'_x \leq \theta_x, \theta'_z \leq \theta_z} i(\theta'_x, \theta'_z)$$

↓ SPHERICAL INTEGRAL IMAGE ↓ ORIGINAL SPHERICAL IMAGE $I(\theta_x, \theta_z) - I(\theta_x + step, \theta_z)$

FEATURE VALUE $= S(E) - S(D)$ $= (ii(5) + ii(2)) - (ii(6) + ii(1)) - ((ii(1) + ii(4)) - (ii(2) + ii(3)))$

IMAGE FEATURE EXTRACTION METHOD AND SYSTEM

BACKGROUND OF THE INVENTION

1. Field of the Invention

The present invention relates to the field of image processing, and particularly relates to an image feature extraction method and an image extraction system.

2. Description of the Related Art

A panoramic image captured by a panoramic camera, for example, an equirectangular image is usually distorted, especially at the positions near two poles, as shown in FIG. 1 which illustrates an example of the panoramic image captured by the panoramic camera. It can be seen from FIG. 1 that the objects in the panoramic image are distorted, especially the objects at the top and bottom portions; for example, the human face at the bottom portion is distorted. As a result, in this kind of distorted panoramic image, it is difficult to carry out image feature extraction and object detection, especially with respect to the distorted objects at the positions near two poles.

Generally, in the conventional techniques, there are two types of methods for carrying out object detection in the panoramic image. The first type of method is conducting projection transformation to correct the panoramic image so as to remove distortions thereof, and then conducting image feature extraction and object detection with respect to the corrected panoramic image. However, the problem of this type of method is that there doesn't exist a perfect projection transformation approach by which not only shapes but also straight lines may be kept. Of course, it is also possible to correct the panoramic image by respectively conducting projection transformation at different positions thereof, but this kind of approach is inefficient. The second type of method is collecting samples at different positions so as to carry out training. For example, it is possible to collect samples at the positions near two poles of the panoramic image so as to carry out the training of image feature extraction, so that it is possible to conduct object detection on the basis of this kind of training. However, the problem of this type of method is that the process of collecting samples is too complicated and very difficult, especially with respect to the objects having various shapes.

Therefore, in order to be able to directly and efficiently conduct image feature extraction and object detection with respect to the panoramic image, it is desirable to propose a new method in which it is not necessary to conduct projection transformation or collect samples at different positions thereof.

SUMMARY OF THE INVENTION

According to a first aspect of the present invention, an image feature extraction method is provided which includes:

a definition step of defining a combination of at least two kinds of solid angles along at least two directions, of an input spherical image;

a determination step of determining respective values of the combination of the at least two kinds of solid angles, so that surface areas of spherical crowns of spherical segments, which are obtained by dividing the spherical image by the respective values of the combination of the at least two kinds solid angles, have a same value; and a generation step of generating, by utilizing the respective values of the combination of the at least two kinds of solid angles, an image feature template so as to conduct image feature extraction.

According to a second aspect of the present invention, an image featured extraction system is provided which includes:

a definition device configured to define a combination of at least two kinds of solid angles along at least two directions, of an input spherical image;

a determination device configured to determine respective values of the combination of the at least two kinds of solid angles, so that surface areas of spherical crowns of spherical segments, which are obtained by dividing the spherical image by the respective values of the combination of the at least two kinds solid angles, have a same value; and a generation device configured to generate, by utilizing the respective values of the combination of the at least two kinds of solid angles, an image feature template so as to conduct image feature extraction.

As a result, by utilizing the image featured extraction method and system, it is possible to not only introduce the concept of a solid angle for measuring a spherical surface but also propose a surface integral image for conducting image feature calculation and extraction. Since this kind of method is more efficient, and is more suitable to a case of a spherical surface, it is possible to obtain a better image feature extraction result and a better object detection result.

BRIEF DESCRIPTION OF THE DRAWINGS

FIG. 3 is a flowchart of an image feature extraction method according to an embodiment of the present invention;

FIG. 4 is a block diagram of an image feature extraction system according to an embodiment of the present invention;

FIG. 5 is a flowchart of an image feature extraction method according to another embodiment of the present invention;

FIG. 7 is a flowchart of a process of conducting image feature extraction with respect to the spherical image (i.e., STEP S12) in the method shown in FIG. 5;

FIG. 8A is a flowchart of a process of defining a solid angle pair (i.e., STEP S122) in the process shown in FIG. 7;

FIG. 8B includes images (a) and (b) for describing a detailed process of defining a solid angle pair;

FIG. 9D includes images (a) and (b) which are a longitude and latitude-based image of a panoramic image and an image obtained after conducting division by using the respective angles of a solid angle pair with respect to the longitude and latitude-based image, respectively;

FIG. 10A is a flowchart of a process of conducting image feature extraction on the basis of a surface integral image (i.e., STEP S124) in the process shown in FIG. 7;

FIGS. 10B to 10E illustrate a detailed process of conducting image feature extraction on the basis of a surface integral image;

DETAILED DESCRIPTION OF THE PREFERRED EMBODIMENTS

In order to let those people skilled in the art better understand the present invention, hereinafter the present invention will be concretely described on the basis of the drawings and various embodiments.

Figure 1:
FIG. 1 illustrates an example of a panoramic image captured by a panoramic camera.
Figure 2:
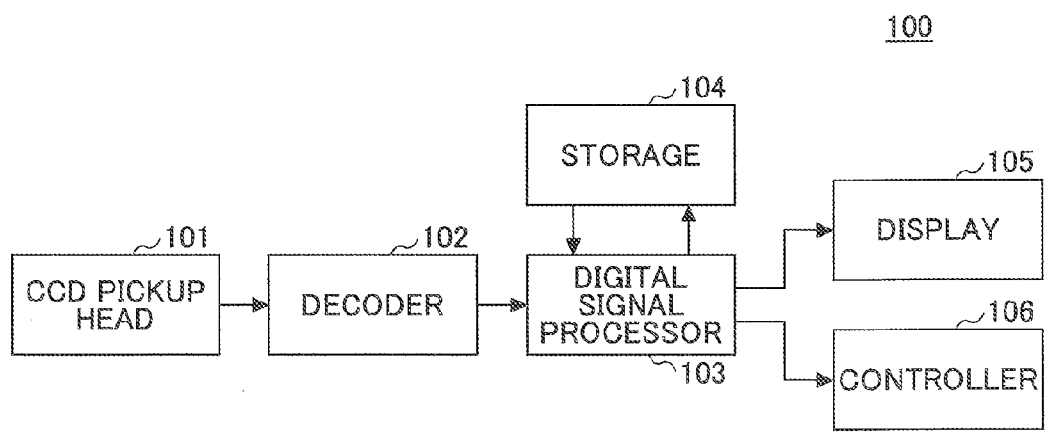
FIG. 2 is a block diagram of a hardware configuration which may utilize various embodiments of the present invention.

FIG. 2 is a block diagram of a hardware configuration 100 which may utilize various embodiments of the present invention.

For example, it is possible to use a panoramic camera having a CCD (Charge Coupled Device) pickup head 101 to capture a panoramic image, and then to output the captured panoramic image into a digital signal processor 103 via a decoder 102. After that, the digital signal processor 103 reads necessary data from a storage 104 to conduct image processing, so as to obtain an image feature template, the results of image feature extraction, object detection, and object recognition on the basis of the image feature template, etc. And then, the obtained results, etc., may be stored in the storage 104 for storing, may be output into a display 105 for displaying, and/or may be sent to a controller 106 for conducting further processing such as vehicle drive control.

Of course, it is also possible to directly input a spherical image, which is converted from a panoramic image or is captured in a special way, into the digital signal processor 103 via the decoder 102. In this case, the CCD pickup head 101 may be omitted. In addition, the image feature extraction method and system according to various embodiments of the present invention may be applied to the digital signal processor 103.

FIG. 3 is a flowchart of an image feature extraction method according to an embodiment of the present invention.

As shown in FIG. 3, the image extraction method includes STEPS S301 to S303.

STEP S301 is a definition step for defining a combination of at least two kinds of solid angles along at least two directions, of an input spherical image.

STEP S302 is a determination step for determining the respective values of the combination of the at least two kinds of solid angles, so that the surface areas of the spherical crowns of the spherical segments, which are obtained by dividing the spherical image by the respective values of the combination of the at least two kinds of solid angles, are the same (i.e., have a same value).

STEP S303 is a generation step for generating, by utilizing the respective values of the combination of the at least two kinds of solid angles, an image feature template so as to conduct image feature extraction.

Hence, in this way, by defining the combination of the at least two kinds of solid angles (hereinafter, also called a "solid angle combination") of a spherical image and determining its respective values, it is possible to reasonably divide the spherical image, so that the divided spherical image may have less distortion or may not even have distortion. In addition, it is also possible to utilize this kind of solid angle combination as input, so as to generate a proper image feature template for carrying out image feature extraction and object detection.

Moreover, the image extraction method shown in FIG. 3 may further include a step of converting a panoramic image so as to obtain the spherical image. That is to say, instead of the spherical image, it is also possible to input a panoramic image captured by a panoramic camera, and then to convert, by conducting image processing, the panoramic image into the spherical image.

In an example, the panoramic image may be an equirectangular image, and the equirectangular image may be converted into the spherical image by utilizing the following equation (1).

$$r: [-\pi, \pi] \times [-\frac{\pi}{2}, \frac{\pi}{2}] \to R^2 \quad (1)$$

$$(\lambda, \phi) \mapsto (\cos(\lambda)\cos(\phi), \sin(\lambda)\cos(\phi), \sin(\phi))$$

Here $\lambda$ stands for a degree of longitude of the equirectangular image; $\phi$ stands for a degree of latitude of the equirectangular image; r stands for mapping from the equirectangular image to the spherical image; and R stands for the radius of the spherical image.

Of course, the equation (1) is just an example of converting the panoramic image (i.e., the equirectangular image) into the spherical image. In other words, if the panoramic image is another type one, then it is also possible to adopt a proper known equation to conduct conversion from this panoramic image to the spherical image.

Furthermore, the concept of a solid angle is well-known to those people skilled in the art. For more information about that, it is also possible to see https://en.wikipedia.org/wiki/Solid_angle.

In an example, the at least two directions of the solid angle combination includes any two of the directions along X, Y, and Z axes of the spherical image. For instance, it is possible to define two kinds of solid angles, namely, a kind of solid angle is along the X axis, and another kind of solid angle is along the Z axis. In this way, by defining different kinds of solid angles along different directions, it is possible to simultaneously describe the spherical image along the different directions so as to uniquely utilize the different kinds of solid angles to express the spherical image, thereby being capable of laying a foundation for generating the image feature template and conducting the image feature extraction and object detection on the basis of the generated image feature template.

In an example, STEP S301 of FIG. 3 may include a step of defining two kinds of solid angles (hereinafter, also called a "solid angle pair") by utilizing the following equations (2) and (3).

$$\theta_x = 2\pi\left(1 - \cos\left(\arccos\left(\cos\phi\cos\left(\frac{\pi}{2} - \lambda\right)\right)\right)\right) = 2\pi(1 - \cos\phi\sin\lambda) \in [0, 4\pi] \quad (2)$$

$$\theta_z = 2\pi\left(1 - \cos\left(\frac{\pi}{2} - \phi\right)\right) = 2\pi(1 - \sin\phi) \in [0, 4\pi] \quad (3)$$

Here $\theta_x$ refers to a kind of solid angle along the X axis; $\theta_z$ refers to another kind of solid angle along the Z axis; R refers to the radius of the spherical image; λ refers to a degree of longitude of the panoramic image; and φ refers to a degree of latitude of the panoramic image.

Of course, this kind of definition is achieved by utilizing the degrees of longitude and latitude of the panoramic image, and is just an example. That is to say, it is also possible to utilize any other proper way to define the solid angle pair.

In addition, the solid angle pair defined in the way above may have uniqueness and monotonicity. The uniqueness means that regarding each point (e.g., a pixel-based point) on the spherical image, its corresponding solid angle pair differs from any other one on the spherical image. The monotonicity means that on the panoramic image, the greater a degree of latitude (when the X-Y plane serves as an equator or the Y-Z plane serves as an equator) of a point is, the less the value of a kind of solid angle corresponding to the point is. Of course, the uniqueness and monotonicity are not absolute; for example, it is also possible to divide a spherical surface into two semi-spherical surfaces, i.e., front and rear semi-spherical surfaces or upper and lower semi-spherical surfaces, and to let the uniqueness and monotonicity be met in each semi-spherical surface.

In an example, STEP S302 of FIG. 3 may include a step of determining the respective values of each kind of solid angle in the solid angle combination on a semi-spherical surface by utilizing the following equation (4).

$$\theta(i) = \frac{2i^2}{N^2}\pi \quad (4)$$

Here N denotes the number of shapes (spherical segments) obtained by dividing the semi-spherical surface by the respective values of the corresponding kind of solid angle; θ (i) denotes an i-th value of the corresponding kind of solid angle; and i denotes a positive integer less than or equal to N.

After that, it is possible to symmetrically expand the respective values of each kind of solid angle in the solid angle combination on the semi-spherical surface to the whole spherical surface.

The respective values of each kind of solid angle determined in the way above may result in that the surface areas of the spherical crowns of the spherical segments, which are obtained by dividing the spherical image by the respective values of the solid angle combination, are the same or evenly distributed. As a result, it is possible to ensure that the image of each of the grids (spherical segments) obtained by dividing the spherical image in the way above has less distortion, or does not even have distortion, so that it is possible to avoid the distortion problem occurring in the panoramic image, thereby being able to more efficiently generate the image feature template, and to more accurately conduct the image feature extraction and object detection on the basis of the generated image feature template.

In an example, the image feature template may include a Haar image feature template able to be calculated by utilizing an integral image or another image feature template able to be calculated by utilizing the integral image. Here it should be noted that utilizing an integral image to obtain the image feature template is just a simple way of generating the image feature template; that is to say, the present invention is not limited to this. Actually, on the basis of the defined solid angle combination, it is also possible to adopt another image feature template, for example, a HOG (Histogram of Oriented Gradient) image feature template and a SIFT (Scale Invariant Feature Transform) image feature template.

In an example, STEP S303 of FIG. 3 may include a step of utilizing the following equation (5) to generate an integral image serving as the image feature template.

$$ii(\theta_x, \theta_z) = \sum_{\theta'_x \leq \theta_x, \theta'_z \leq \theta_z} i(\theta'_x, \theta'_z) \quad (5)$$

Here $i(\theta'_x, \theta'_z)$ refers to the gray level of the spherical segment of the spherical image, defined by $\theta'_x$ and $\theta'_z$; $ii(\theta_x, \theta_z)$ refers to the integral image (i.e., a surface integral image); and $\theta'_x$ and $\theta'_z$ satisfy the following equation (6).

$$\begin{cases} \theta'_x(k) = \frac{2k^2}{N^2}\pi & (k = 1, 2, \ldots, N) \\ \theta'_z(k) = \frac{2k^2}{N^2}\pi & (k = 1, 2, \ldots, N) \end{cases} \quad (6)$$

Up to here, an example of generating the Haar image feature template by utilizing the respective values of the solid angle combination as input has been described; however, the present invention is not limited to this.

In an example, the method shown in FIG. 3 may further include a step of carrying out object detection on the basis of an extracted image feature. Of course, the object detection is just a kind of application conducted by utilizing the extracted image feature; in other words, the present invention is not limited to this. Actually, after extracting the image feature, it is also possible to use the extracted image feature to carry out object recognition, object tracking, etc.

Hence, by defining the solid value combination of the spherical image and determining its respective values, it is possible to carry out reasonable division with respect to the spherical image, so that, in the divided spherical image, there does not exist distortions. In this way, it is possible to avoid the distortion problem occurring in the panoramic image. In addition, by utilizing this kind of solid angle combination as input so as to generate a proper image feature template for conducting image feature extraction, it is possible to efficiently (i.e., with a small calculation amount and less time) generate the image feature template and to more accurately conduct the image feature extraction, so that it is possible to use, for example, the training samples without distortions to carry out a more reliable object detection, etc.

FIG. 4 is a block diagram of an image feature extraction system 400 according to an embodiment of the present invention.

As shown in FIG. 4, the system 400 includes a definition device 401, a determination device 402, and a generation device 403.

The definition device 401 is configured to define a combination of at least two kinds of solid angles along at least two directions, of an input spherical image.

The determination device 402 is configured to determine the respective values of the combination of the at least two kinds of solid values so that the surface areas of the spherical crowns of the spherical segments obtained by dividing the spherical image by the respective values of the combination of the at least two kinds of solid values are the same.

The generation device 403 is configured to utilize the respective values of the combination of the at least two kinds of solid angles as input so as to generate an image feature template for carrying out image feature extraction.

Hence, by defining the solid angle combination of the spherical image and determining its respective values, it is possible to reasonably divide the spherical image so as to reduce or completely remove the distortions of the divided spherical image. In addition, by utilizing this kind of solid angle combination as input so as to establish a proper image feature template, it is also possible to achieve functions such as image feature extraction and further object detection.

In addition, the system 400 may include a conversion device configured to conduct conversion with respect to a panoramic image so as to obtain the spherical image. In other words, instead of the spherical image, it is also possible to directly input a panoramic image captured by a panoramic camera. After that, by utilizing image processing so as to convert the panoramic image into the spherical image, it is possible to carry out the follow-on processes.

In an example, the panoramic image may be an equirectangular image which may be converted into the spherical image by utilizing the following equation (1).

$$r: [-\pi, \pi] \times [-\frac{\pi}{2}, \frac{\pi}{2}] \to R^2 \qquad (1)$$
$$(\lambda, \phi) \mapsto (\cos(\lambda)\cos(\phi), \sin(\lambda)\cos(\phi), \sin(\phi))$$

Here $\lambda$ stands for a degree of longitude of the panoramic image; $\phi$ stands for a degree of latitude of the panoramic image; r stands for mapping from the panoramic image to the spherical image; and R stands for the radius of the spherical image.

Of course, the equation (1) is just an example of converting the panoramic image (i.e., the equirectangular image) into the spherical image. In other words, if the panoramic image is another type one, then it is also possible to adopt a proper known equation to conduct conversion from this panoramic image to the spherical image.

Furthermore, the concept of a solid angle is well-known to those people skilled in the art. For more information about that, it is also possible to see https://en.wikipedia.org/wiki/Solid_angle.

In an example, the at least two directions of the solid angle combination include any two of the directions along X, Y, and Z axes of the spherical image. For instance, it is possible to define two kinds of solid angles, namely, a kind of solid angle is along the X axis, and another kind of solid angle is along the Z axis. In this way, by defining different kinds of solid angles along different directions, it is possible to simultaneously describe the spherical image along the different directions so as to uniquely utilize the different kinds of solid angles to express the spherical image, thereby being capable of laying a foundation for generating the image feature template and conducting the feature extraction and object detection on the basis of the generated image feature template.

In an example, the definition device 401 of the system 400 may be configured to define two kinds of solid angles by utilizing the following equations (2) and (3).

$$\theta_x = 2\pi\left(1 - \cos\left(\arccos\left(\cos\phi\cos\left(\frac{\pi}{2} - \lambda\right)\right)\right)\right) = 2\pi(1 - \cos\phi\sin\lambda) \in [0, 4\pi] \qquad (2)$$

-continued $$\theta_z = 2\pi\left(1 - \cos\left(\frac{\pi}{2} - \phi\right)\right) = 2\pi(1 - \sin\phi) \in [0, 4\pi] \qquad (3)$$

Here $\theta_x$ refers to a kind of solid angle along X axis; $\theta_z$ refers to another kind of solid angle along Z axis; R refers to the radius of the spherical image; $\lambda$ refers to a degree of longitude of the panoramic image; and $\phi$ refers to a degree of latitude of the panoramic image.

Of course, this kind of definition is achieved by utilizing the degrees of longitude and latitude of the panoramic image, and is just an example. That is to way, it is also possible to utilize any other proper way to define the solid angle pair.

In addition, the solid angle pair defined in the way above may have uniqueness and monotonicity. The uniqueness means that regarding each point (e.g., a pixel-based point) on the spherical image, its corresponding solid angel pair differs from any other one on the spherical image. The monotonicity means that on the panoramic image, the greater a degree of latitude (when the X-Y plane serves as an equator or the Y-Z plane serves as an equator) of a point is, the less the value of a kind of solid angle corresponding to the point is. Of course, the uniqueness and monotonicity are not absolute; for example, it is also possible to divide a spherical surface into two semi-spherical surfaces, i.e., front and rear semi-spherical surfaces or upper and lower semi-spherical surfaces, and to let the uniqueness and monotonicity be met in each semi-spherical surface.

In an example, the determination device 402 of the system 400 may be configured to determine the respective values of each kind of solid angle in the solid angle combination on a semi-spherical surface by utilizing the following equation (4).

$$\theta(i) = \frac{2i^2}{N^2}\pi \qquad (4)$$

Here N denotes the number of shapes (spherical segments) obtained by dividing the semi-spherical surface by the respective values of the corresponding kind of solid angle; $\theta(i)$ denotes an i-th value of the corresponding kind of solid angle; and i denotes a positive integer less than or equal to N.

After that, it is possible to symmetrically expand the respective values of each kind of solid angle in the solid angle combination on the semi-spherical surface to the whole spherical surface.

The respective values of each kind of solid angle determined in the way above may result in that the surface areas of the spherical crowns of the spherical segments, which are obtained by dividing the spherical image by the respective values of the solid angle combination, are the same or evenly distributed. As a result, it is possible to ensure that the image of each of the grids (spherical segments) obtained by dividing the spherical image in the way above has less distortion, or does not even have distortion, so that it is possible to avoid the distortion problem occurring in the panoramic image, thereby being able to more efficiently generate the image feature template, and to more accurately conduct the image feature extraction and object detection on the basis of the generated image feature template.

In an example, the image feature template may include a Haar image feature template being able to be calculated by utilizing an integral image or another image feature template being able to be calculated by utilizing the integral image. Here it should be noted that utilizing an integral image to obtain the image feature template is just a simple way of generating the image feature template; that is to say, the present invention is not limited to this. Actually, on the basis of the defined solid angle combination, it is also possible to adopt another image feature template, for example, a HOG (Histogram of Oriented Gradient) image feature template and a SIFT (Scale Invariant Feature Transform) image feature template.

In an example, the generation device 403 of the system 400 may be configured to utilize the following equation (5) to generate an integral image serving as the image feature template.

$$ii(\theta_x, \theta_z) = \sum_{\theta'_x \le \theta_x, \theta'_z \le \theta_z} i(\theta'_x, \theta'_z) \quad (5)$$

Here $i(\theta'_x, \theta'_z)$ refers to the gray level of the spherical segment of the spherical image, defined by $\theta'_x$ and $\theta'_z$; $ii(\theta_x, \theta_z)$ refers to the integral image (i.e., a surface integral image); and $\theta'_x$ and $\theta'_z$ satisfy the following equation (6).

$$\begin{cases} \theta'_x(k) = \frac{2k^2}{N^2}\pi & (k = 1, 2, \ldots, N) \\ \theta'_z(k) = \frac{2k^2}{N^2}\pi & (k = 1, 2, \ldots, N) \end{cases} \quad (6)$$

Up to here, an example of generating the Haar image feature template by utilizing the respective values of the solid angle combination as input has been described; however, the present invention is not limited to this.

In an example, the system 400 shown in FIG. 4 may further include a detection device configured to carry out object detection on the basis of an extracted image feature. Of course, the object detection is just a kind of application conducted by utilizing the extracted image feature; in other words, the present invention is not limited to this. Actually, after extracting the image feature, it is also possible to use the extracted image feature to carry out object recognition, object tracking, etc.

Hence, by defining the solid value combination of the spherical image and determining it respective values, it is possible to carry out reasonable division with respect to the spherical image, so that, in the divided spherical image, there does not exist distortions. In this way, it is possible to avoid the distortion problem occurring in the panoramic image. In addition, by utilizing this kind of solid angle combination as input so as to generate a proper image feature template for conducting image feature extraction, it is possible to efficiently (i.e., with a small calculation amount and less time) generate the image feature template and to more accurately conduct the image feature extraction, so that it is possible to use, for example, the training samples without distortions to carry out a more reliable object detection, etc.

FIG. 5 is a flowchart of an image feature extraction method according to another embodiment of the present invention.

As shown in FIG. 5, the method includes at least STEPS S11 to S13. In STEP S11, a panoramic image is converted into a spherical image. In STEP S12, image feature extraction is conducted with respect to the spherical image. In STEP S13, object detection is carried out.

Here it should be noted that what the method shown in FIG. 5 includes is just an example; that is to say, the present invention is not limited to this. For example, STEP S11 is for obtaining the spherical image just in a case where the panoramic image is input in STEP S10. In addition, STEP S13 is just for conducting the object detection if it needs to be done. In this case, the method shown in FIG. 5 may further include STEP S14.

Figure 6A:
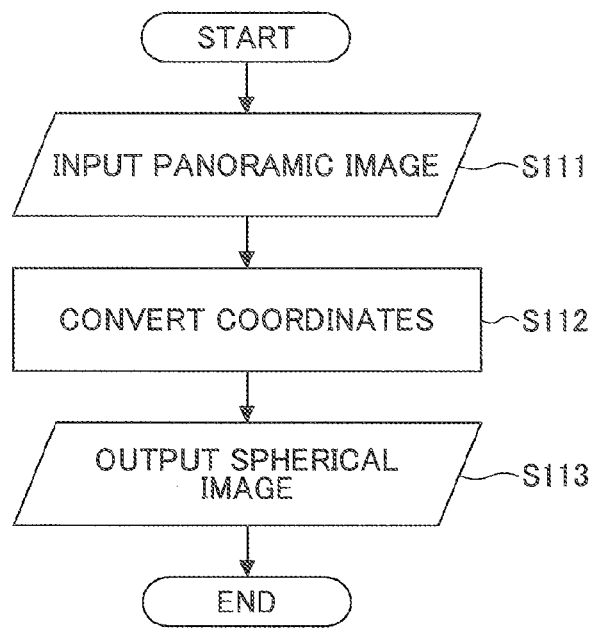
FIG. 6A is a flowchart of a process of converting a panoramic image into a spherical image (i.e., STEP S11) in the method shown in FIG. 5.

FIG. 6A is a flowchart of a process of converting a panoramic image into a spherical image (i.e., STEP S11) in the method shown in FIG. 5.

As shown in FIG. 6A, in STEP S111, the panoramic image is input. And then, in STEP S112, the panoramic image is converted into the spherical image (i.e., coordinate conversion from the panoramic image into the spherical image is conducted). After that, the converted spherical image is output. An example of the coordinate conversion equation as follows.

$$r: [-\pi, \pi] \times \left[-\frac{\pi}{2}, \frac{\pi}{2}\right] \to R^2 \quad (1)$$

$$(\lambda, \phi) \mapsto (\cos(\lambda)\cos(\phi), \sin(\lambda)\cos(\phi), \sin(\phi))$$

Here $\lambda$ stands for a degree of longitude of the panoramic image; $\phi$ stands for a degree of latitude of the panoramic image; r stands for mapping from the panoramic image to the spherical image; and R stands for the radius of the spherical image. In addition, the panoramic image processed by the coordinate conversion equation is an equirectangular image, and the coordinate conversion equation is one in a spherical coordinate system.

Here it should be noted that if another type of panoramic image is input, then it is possible to adopt a proper conversion equation corresponding to this panoramic image. Furthermore, if a spherical image is input, then it is also possible to omit this step.

Figure 6B:
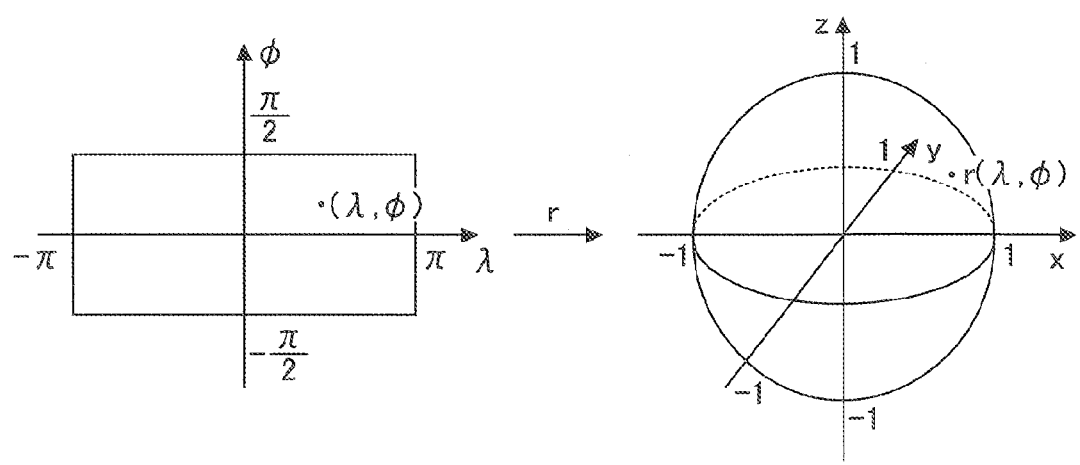
FIG. 6B illustrates a detailed process of converting a panoramic image into a spherical image.

FIG. 6B illustrates a detailed process of converting a panoramic image into a spherical image.

FIG. 6B includes first and second images from left to right, where the first image illustrates a panoramic image which is a plane similar to a rectangle having longitude and latitude coordinates $(\lambda, \phi)$. By utilizing the equation (1) above to convert the panoramic image, it is possible to obtain a spherical image illustrated by the second image, which is a spherical surface expressed by three directions of X, Y, and Z axes. The longitude and latitude coordinates $(\lambda, \phi)$ are mapped into corresponding positions of the spherical image.

FIG. 7 is a flowchart of a process of conducting image feature extraction with respect to the spherical image (i.e., STEP S12) in the method shown in FIG. 5.

As shown in FIG. 7, STEP S12 of the method shown in FIG. 5 may include STEPS S121 to S125. In STEP S121, the converted spherical image is obtained as input. In STEP S122, a solid angle pair is defined. In STEP S123, the respective values of the solid angle pair are determined. In STEP S124, on the basis of an integral image, the image feature extraction is conducted. In STEP S125, the extracted image feature is output.

Here it should be noted that defining the solid angle pair (i.e., two kinds of solid angles) is just an example. Actually it is also to define more kinds of solid angles so as to carry out more accurate spherical surface division and image feature extraction.

FIG. 8A is a flowchart of a process of defining the solid angle pair (i.e., STEP S122) in the process shown in FIG. 7.

As shown in FIG. 8A, the process includes STEPS S1221 to S1224. In STEP S1221, the converted spherical image is input. In STEP S1222, a kind of solid angle related to the X axis is defined. In STEP S1223, a kind of solid angle related to the Z axis is defined. In STEP S1224, a combination of the defined two kinds of solid angles (i.e., the solid angle pair) is out.

FIG. 8B includes images (a) and (b) for describing a detailed process of defining a solid angle pair.

As shown in FIG. 8B, the image (a) illustrates an example of a kind of solid angle related to the X axis, which is restricted by a circle EF that is the surface of a spherical crown AEF. The image (b) illustrates an example of another kind of solid angle related to the Z axis, which is restricted by a circle CD that is the surface of a spherical crown BCD.

The circle EF is perpendicular to the X axis, and its corresponding solid angle $\theta_x$ may be defined by the following equation.

$$\theta_x = \frac{S_x}{R^2} = \frac{S_{AEF}}{R^2} = \quad (2)$$
$$2\pi\left(1 - \cos\left(\arccos\left(\cos\phi\cos\left(\frac{\pi}{2} - \lambda\right)\right)\right)\right) = 2\pi(1 - \cos\phi\sin\lambda) \in [0, 4\pi]$$

The circle CD is perpendicular to the Z axis, and its corresponding solid angle $\theta_z$ may be defined by the following equation.

$$\theta_z = \frac{S_z}{R^2} = \frac{S_{BCD}}{R^2} = 2\pi\left(1 - \cos\left(\frac{\pi}{2} - \phi\right)\right) = 2\pi(1 - \sin\phi) \in [0, 4\pi] \quad (3)$$

In the above two equations, $\lambda$ refers to a degree of longitude; $\phi$ refers to a degree of latitude; $S_{AEF}$ refers to the surface area of the spherical crown AEF, as shown in the image (a) of FIG. 8B; $S_{BCD}$ refers to the surface area of the spherical crown BCD, as shown in the image (b) of FIG. 8B; $\theta_x$ refers to the kind of solid angle related to the X axis; and $\theta_z$ refers to the other kind of solid angle related to the Z axis. According the above two equations, it is apparent that the range of each of $\theta_x$ and $\theta_z$ is within $[0, 4\pi]$.

The solid angle combination (also called a "solid angle pair") defined in the way above may have uniqueness and monotonicity.

Figure 8C:
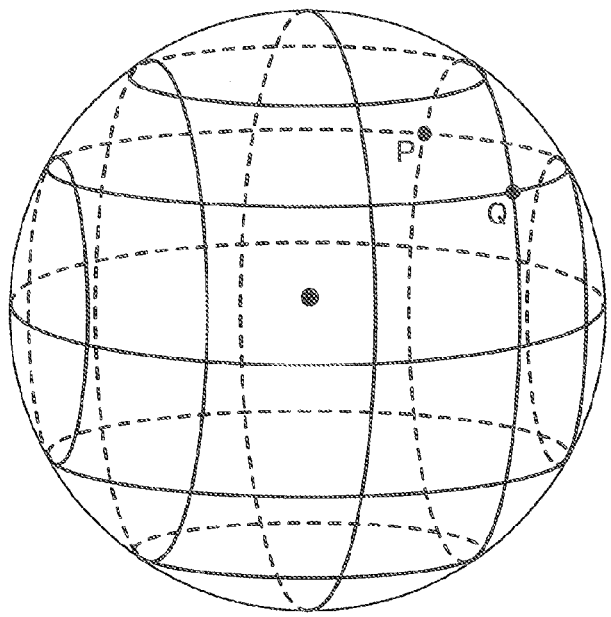
FIGS. 8C and 8D illustrate uniqueness and monotonicity of a solid angle pair, respectively.
Figure 8D:
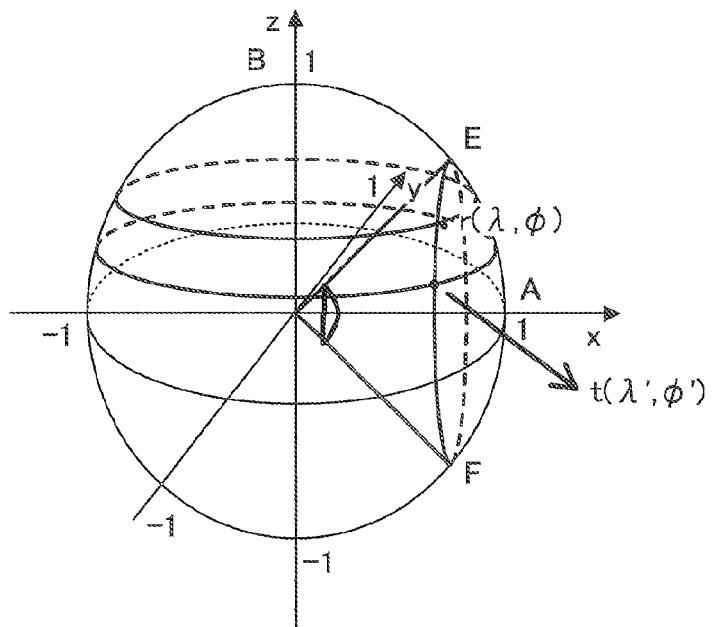

FIGS. 8C and 8D illustrate the uniqueness and monotonicity of the solid angle pair, respectively.

According to the image (a) of FIG. 8A, it can be seen that regarding the values of $\theta_x$ corresponding to the all points on the circle EF, they are the same; however, regarding the values of $\theta_z$ corresponding to the all points on the same circle, except some solid angle pairs as shown in FIG. 8C, they are different. Here, according to FIG. 8C, it can be seen that, for example, the solid angle pairs $(\theta_x, \theta_z)$ corresponding to the points P and Q are the same. In this case, it is possible to divide the spherical surface into front and rear semi-spherical surfaces. Thus, each of the semi-spherical surfaces may have the uniqueness.

In addition, according to FIG. 8D, it can be seen that regarding the two points r and t, the values of $\theta_x$ corresponding to them are the same; however, the value of $\theta_z$ corresponding to the point r is less than the value of $\theta_z$ corresponding to the point t, and the degree of latitude corresponding to the point r is greater than that corresponding to the point t. That is to say, the greater the degree of latitude is, the less the corresponding value of $\theta_z$ is.

Figure 9A:
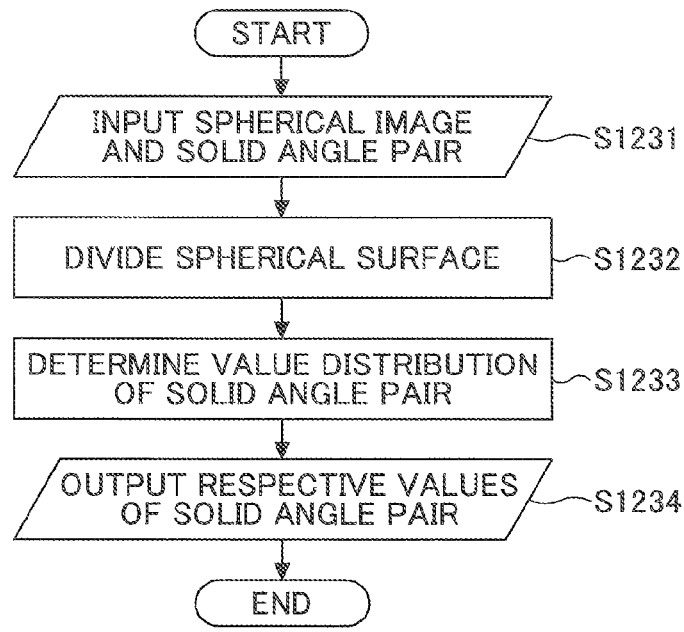
FIG. 9A is a flowchart of a process of determining the respective values of the solid angle pair (i.e., STEP S123) in the process shown in FIG. 7.

FIG. 9A is a flowchart of a process of determining the respective values of the solid angle pair (i.e., STEP S123) in the process shown in FIG. 7.

As shown in FIG. 9A, the process includes STEPS S1231 to S1234. In STEP S1231, the spherical image and the defined two kinds of solid angles are input. In STEP S1232, the spherical image is divided by utilizing the defined two kinds of solid angles. In STEP S1233, the value distribution (i.e., the respective values) of each kind of solid angle is determined. In STEP S1234, the respective values of each kind of solid angle obtained by calculation are output.

Figure 9B:
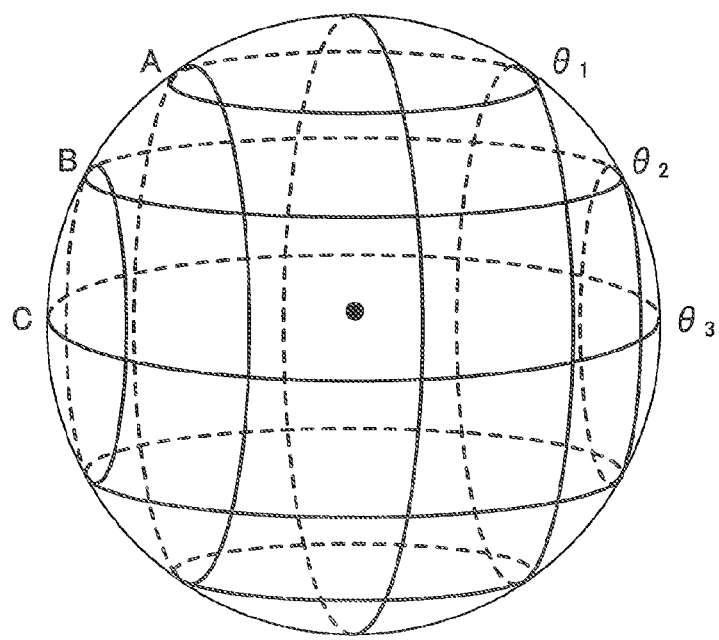
FIGS. 9B and 9C illustrate a detailed process of determining the respective values of a solid angle pair.
Figure 9C:
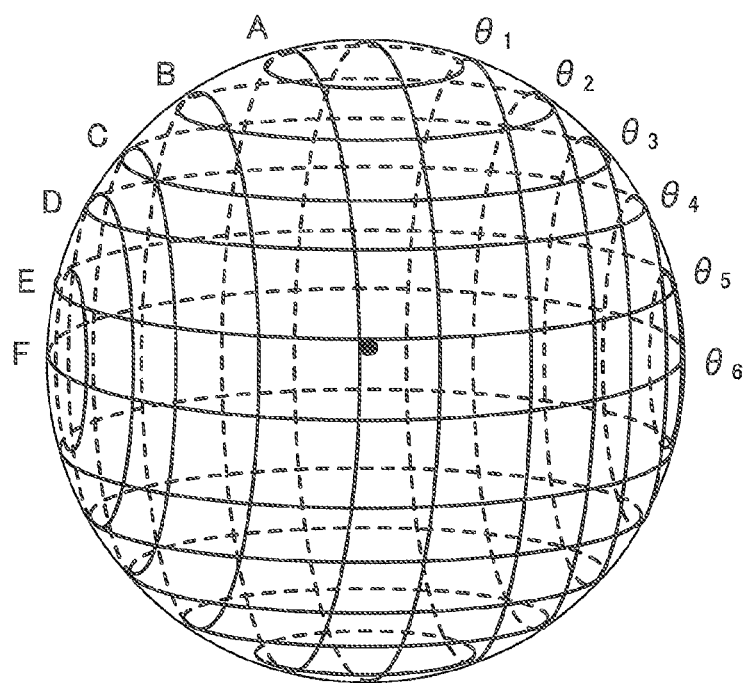

FIGS. 9B and 9C illustrate a detailed process of determining the respective values of a solid angle pair.

As shown in FIG. 9B, the upper semi-spherical surface of a spherical image is divided into three annular sections by utilizing the respective values of a kind of solid angle related to the Z axis; as a result, the spherical image is divided into five (i.e., 3×2−1=5) annular sections along the Z axis in total. In the same way, the right semi-spherical surface of the spherical image is divided into three annular sections by utilizing the respective values of a kind of solid angle related to the X axis; as a result, the spherical image is divided into five (i.e., 3×2−1=5) annular sections along the X axis in total.

Furthermore, as shown in FIG. 9B, the circles on the spherical surface perpendicular to the X axis are tangent to the circles on the spherical surface perpendicular to the Z axis, respectively, so as to generate plural spherical segments. As described above, according to STEP S1233 of FIG. 9A, it is possible to determine the value distribution of each kind of solid angle. As shown in FIG. 9B, it is assumed that the area of each spherical segment is S. Since the spherical crown corresponding to $\theta_3$, which is one of respective values of the kind of solid angle $\theta_z$, is a semi-spherical surface, it is possible to calculate the value of $\theta_3$ as follows.

$$\theta_3 = \frac{S}{R^2} = \frac{2\pi R^2}{R^2} = 2\pi \quad (7)$$

Here R stands for the radius of the spherical image.

On the basis of the above spherical surface division, it is possible to obtain the number of pixels corresponding to each value of the kind of solid angle $\theta_z$ (e.g., $\theta_1$, $\theta_2$, and $\theta_3$). After that, the respective values of $\theta_z$ may be obtained by conducting the following calculation.

$$\begin{cases} S_A = \theta_1 R^2 = 2S \\ S_{AB} = S_B - S_A = (\theta_2 - \theta_1)R^2 = 6S \\ S_{BC} = S_C - S_B = (\theta_3 - \theta_2)R^2 = 10S \end{cases} \rightarrow \begin{cases} \theta_1 = \frac{2}{9}\pi \\ \theta_2 = \frac{8}{9}\pi \\ \theta_3 = 2\pi \end{cases} \quad (8)$$
$$\rightarrow \theta(i) = \frac{2i^2}{9}\pi = \frac{2i^2}{N^2}\pi$$

Here $S_A$ denotes the surface area of the spherical crown corresponding to the solid angle value $\theta_1$; $S_B$ denotes the surface area of the spherical crown corresponding to the solid angle value $\theta_2$; $S_C$ denotes the surface area of the spherical crown corresponding to the solid angle value $\theta_3$; $S_{AB}$ denotes the surface area of the annular spherical surface AB; $S_{BC}$ denotes the surface area of the annular spherical surface BC; N denotes the number of the circles on a semi-spherical surface perpendicular to the Z axis, and the total number of the circles on the spherical surface perpendicular to the Z axis is 2N−1; and, in this example, N=3.

In addition, the spherical surface may also be divided as shown in FIG. 9C. If it is assumed that the area of each spherical segment is S, then in the same way as above, it is also possible to obtain the values of $\theta_6$, $\theta_4$, and $\theta_2$; that is, $\theta_6=2\pi$, $\theta_4=(8/9)\pi$, and $\theta_2=(2/9)\pi$. As a result, on the basis of this kind of spherical surface division, it is also possible to obtain the number of pixels corresponding to each value of $\theta_z$ (e.g., $\theta_1$, $\theta_2$, $\theta_4$, and $\theta_5$). After that, the respective values of the kind of solid angle $\theta_z$ may be acquired by carrying out the following calculation.

$$\theta_6 = 2\pi;\ \theta_4 = \frac{8}{9}\pi;\ \theta_2 = \frac{2}{9}\pi;\ N = 6 \qquad (9)$$

$$\begin{cases} S_A = \theta_1 R^2 = 2S \\ S_{AB} = S_B - S_A = (\theta_2 - \theta_1)R^2 = 6S \\ S_{BC} = S_C - S_B = (\theta_3 - \theta_2)R^2 = 10S \\ S_{CD} = S_D - S_C = (\theta_4 - \theta_3)R^2 = 14S \\ S_{DE} = S_E - S_D = (\theta_5 - \theta_4)R^2 = 18S \\ S_{EF} = S_F - S_E = (\theta_6 - \theta_5)R^2 = 22S \end{cases}$$

$$\rightarrow \begin{cases} \theta_1 = \frac{1}{18}\pi \\ \theta_2 = \frac{2}{9}\pi \\ \theta_3 = \frac{1}{2}\pi \\ \theta_4 = \frac{8}{9}\pi \\ \theta_5 = \frac{25}{18}\pi \\ \theta_6 = 2\pi \end{cases} \rightarrow \theta(i) = \frac{i^2}{18}\pi = \frac{2i^2}{N^2}\pi$$

Here $S_A$ stands for the surface area of the spherical crown corresponding to the solid angle value $\theta_1$; $S_B$ stands for the surface area of the spherical crown corresponding to the solid angle value $\theta_2$; $S_C$ stands for the surface area of the spherical crown corresponding to the solid angle value $\theta_3$; $S_D$ stands for the surface area of the spherical crown corresponding to the solid angle value $\theta_4$; $S_E$ stands for the surface area of the spherical crown corresponding to the solid angle value $\theta_5$; $S_F$ stands for the surface area of the spherical crown corresponding to the solid angle value $\theta_6$; $S_{AB}$ stands for the surface area of the annular spherical surface AB; $S_{BC}$ stands for the surface area of the annular spherical surface BC; $S_{CD}$ stands for the surface area of the annular spherical surface CD; $S_{DE}$ stands for the surface area of the annular spherical surface DE; and $S_{EF}$ stands for the surface area of the annular spherical surface EF. In addition, N stands for the number of the circles on one of the two semi-spherical surfaces, perpendicular to the Z axis; as a result, the total number of the circles on the whole spherical surface, perpendicular to the Z axis is 2N−1. In this example, N=6.

According to the equations (8) and (9), it can be seen that the solid angle value calculation equations are the same.

Furthermore, it is possible to divide the spherical surface and to calculate the corresponding solid angle values. Here it should be noted that the calculated solid angle values also satisfy the following equation.

$$\theta(i) = \frac{2i^2}{N^2}\pi \qquad (4)$$

Here N refers to the number of shapes (spherical segments) obtained by dividing a semi-spherical surface by the respective values of each solid angle value; $\theta(i)$ refers to the i-th value of the corresponding kind of solid angle; and i is a positive integer which is less than or equal to N.

Moreover, regarding a case of a multiple of N (e.g., 2N or 4N), by carrying out the calculation in the same way as above, it is also possible to obtain the equation (4), i.e., $$\theta(i) = \frac{2i^2}{N^2}\pi.$$

After that, by symmetrically expanding the respective values $\theta(i)$ on the semi-spherical surface to the whole spherical surface, it is possible to acquire the solid angle value distribution on the whole spherical surface.

Here it should be noted that since it is assumed that the areas of the respective segments are the same, and because the respective solid angle values are calculated on the basis of the premise, the sizes of the respective spherical segments on the spherical surface divided by the calculated solid angle values should be the same. In addition, each of the shapes of most spherical segments approaches a grid. As a result, it is possible to reach a conclusion that the spherical segments obtained by dividing the whole spherical surface by the calculated values of the defined solid angle pair are uniform. This is the advantage of the defined solid angel pair.

FIG. 9D includes images (a) and (b) which are a longitude and latitude-based image of a panoramic image and an image obtained after conducting division by using the respective angles of a solid angle pair with respect to the longitude and latitude-based image, respectively.

As shown in FIG. 9D, in the image (a), the grids are not uniform. However, in the image (b), the grids are uniform. In addition, it can be seen from the images (a) and (b) that the human face in the image (a) is deformed, but the same human face in the image (b) is not deformed.

FIG. 10A is a flowchart of a process of conducting image feature extraction on the basis of a surface integral image (i.e., STEP S124) in the process shown in FIG. 7.

FIGS. 10B to 10E illustrate a detailed process of conducting image feature extraction on the basis of a surface integral image.

As shown in FIG. 10A, STEP S124 of FIG. 7 includes STEPS S1241 to S1245. In STEP S1241, the spherical image and the calculated respective values of the solid angle pair are obtained so as to serve as input. In STEP S1242, an image feature template is defined. In STEP S1243, the surface integral image is calculated. In STEP S1244, image feature values are calculated. In STEP S1245, the calculated image feature values are output.

Figure 10B:
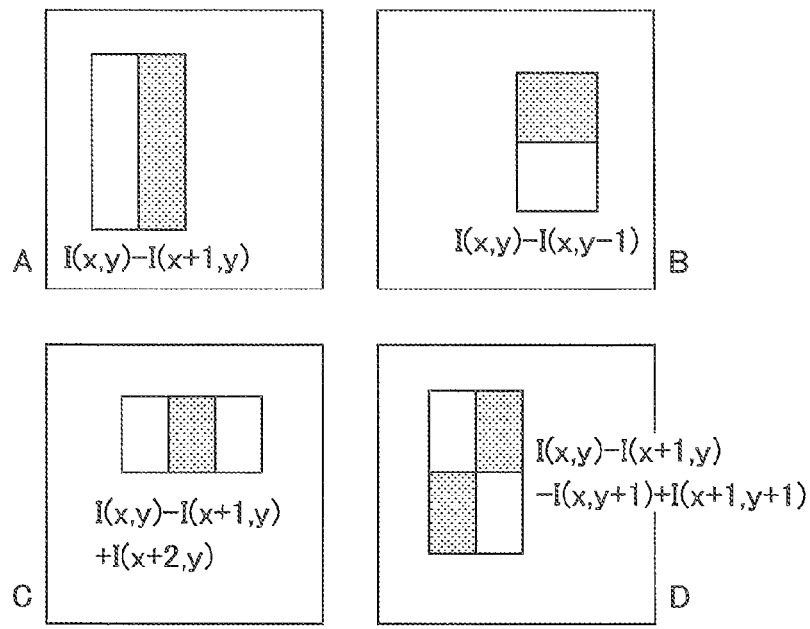

Particularly, in STEP S1242, the image feature template may be one of Haar feature templates shown in FIG. 10B or any other proper image feature template. The present invention is not limited to this.

As shown in FIG. 10B, it is possible to use a simple rectangular combination to serve as the image feature template. This kind of feature template may be formed by two or more congruent adjacent rectangles. In this kind of image feature template, there are two types of rectangles, i.e., white and black types, which are arranged in an interleaved way. In addition, the image feature value of this kind of image feature template is defined as the result of subtracting the sum of pixels in the black rectangle from the sum of pixels in the white rectangle. Particularly, in FIG. 10B, there are four simple image feature templates A, B, C, and D. The image features templates A and B stand for edge features, the image feature template C stands for a linear feature, and the image feature template D stands for a specific direction feature.

Figure 10C:
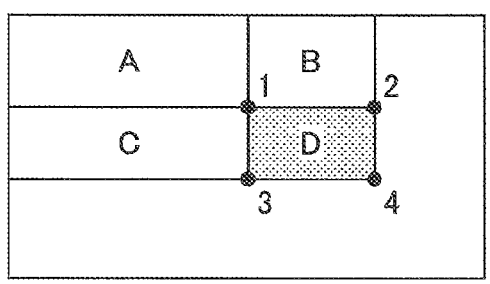

As shown in FIG. 10C, a typical algorithm of calculating an integral image is given. Here it should be noted that the concept of an integral image is similar to the concept of integral in calculus; both of them are calculating the area of a rectangle formed by a top-left point serving as an origin and a bottom-right point. In particular, regarding a point (x,y) in an image, its integral image ii(x,y) may be defined as follows.

$$ii(x, y) = \sum_{x' \leq x, y' \leq y} i(x', y')$$

Here i(x',y') is called an "original image" at a point (x',y'), and is the color value of the point; in a case of a grayscale image, its value is from 0 to 255.

It is thus apparent that by scanning the image only once, it is possible to obtain the whole integral image matrix.

After that, as shown in FIG. 10C, it may be known that ii(1)=the sum of pixels in a region A, ii(2)=the sum of pixels in regions A and B, ii(3)=the sum of pixels in regions A and C, ii(4)=the sum of pixels in regions A, B, C, and D. As a result, it is possible to know that the sum of pixels of the region D=ii(1)+ii(4)−(ii(2)+ii(3)).

Here it should be noted that for more information about the integral image, it is also possible to see https://en.wikipedia.org/wiki/Integral_image.

For example, in a case of the image feature template A shown in FIG. 10B, the image feature value of the image feature template A is defined as "the sum of pixels in the white rectangle (region)−the sum of pixels in the black rectangle (region)", as described above.

In this case, since the sum of pixels in the white rectangle (region) may be calculated as ii(4)+ii(1)−(ii(2)+ii(3)), and because the sum of pixels in the black rectangle (region) may be calculated as ii(6)+ii(3)−(ii(4)+ii(5)), the image feature value of the image feature template A shown in FIG. 10B may be obtained as (ii(4)−ii(3))−(ii(2)−ii(1))+(ii(4)−ii(3))−(ii(6)−ii(5))=S(E)−S(D), as shown in FIG. 10D. Here S refers to an area.

In the same way, in a case of the spherical image used in the embodiments of the present invention, as shown in FIG. 10E, if the spherical segments, which are obtained by dividing the spherical image by the respective values of the solid angle combination, are considered as rectangles, then the corresponding feature value may be obtained as S(E)−S(D)=(ii(5)+ii(2))−(ii(6)+ii(1))−(ii(1)+ii(4))−(ii(2)+ii(3)), as shown in FIG. 10E.

As a result, in STEP S1243 of FIG. 10A, when calculating the spherical integral image, it may be defined as follows.

$$ii(\theta_x, \theta_z) = \sum_{\theta'_x \leq \theta_x, \theta'_z \leq \theta_z} i(\theta'_x, \theta'_z) \tag{5}$$

Here i($\theta'_x$, $\theta'_z$) stands for a gray level of a spherical segment in the spherical image, defined by $\theta'_x$, and $\theta'_z$; ii($\theta_x$, $\theta_z$) stands for the spherical integral image; and $\theta'_x$ and $\theta'_z$ need to satisfy the following equation.

$$\begin{cases} \theta'_x(k) = \frac{2k^2}{N^2}\pi & (k = 1, 2, \ldots, N) \\ \theta'_z(k) = \frac{2k^2}{N^2}\pi & (k = 1, 2, \ldots, N) \end{cases} \tag{6}$$

After that, as described above, by scanning the whole spherical image, it is possible to acquire the whole integral image matrix of the spherical image used in the embodiments of the present invention, so that it is possible to utilize, for example, the image feature template A shown in FIG. 10B to calculate an image feature value, and let the calculated feature value serve as an image feature.

Here it should be noted that although the image feature template A among the Haar feature templates shown in FIG. 10B is taken as an example for description, the present invention is not limited to this.

Figure 11A:
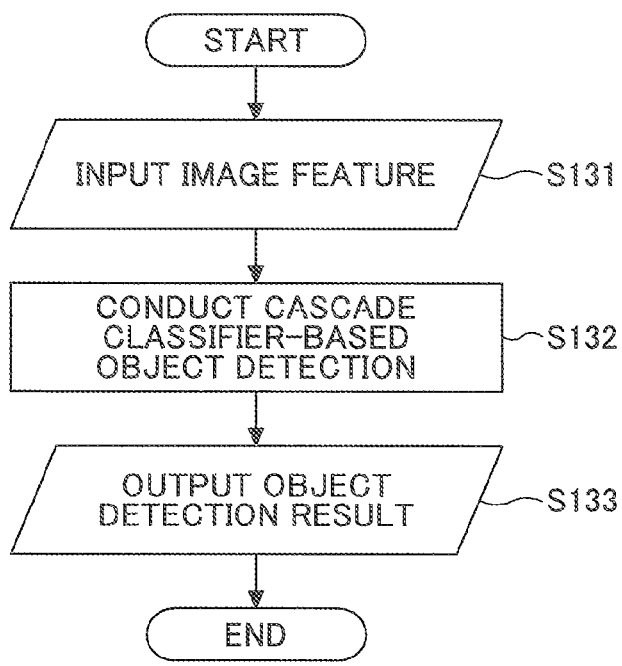
FIG. 11A is a flowchart of a process of conducting object detection (i.e., STEP S13) in the method shown in FIG. 5.

FIG. 11A is a flowchart of a process of conducting object detection (i.e., STEP S13) in the method shown in FIG. 5.

As shown in FIG. 11A, the process may include STEPS S131 to S133. In STEP S131, the extracted image feature is input. In STEP S132, cascade classifier-based object detection is conducted. In STEP S133, the object detection result is output.

Figure 11B:
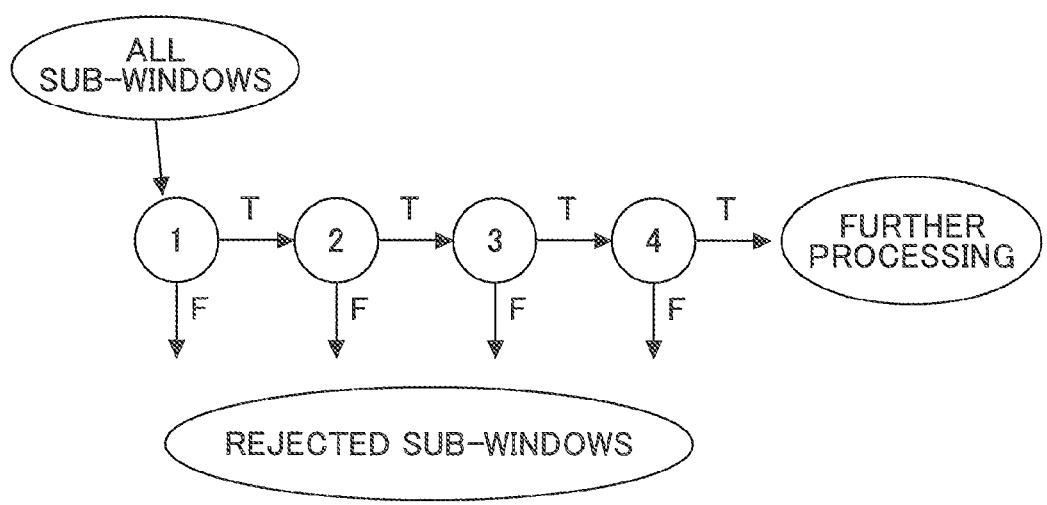
FIG. 11B illustrates an example of conducting cascade classifier-based object detection.

FIG. 11B illustrates an example of conducting cascade classifier-based object detection.

Here, since this kind of cascade classifier-based object detection is well-known in the art, its related description is omitted.

Therefore, in this way, by defining the solid angle combination of a spherical image and determining its respective values, it is possible to reasonably divide the spherical image, so that the divided spherical image may have less distortion or may not even have distortion. In addition, it is also possible to utilize this kind of solid angle combination as input so as to generate a proper image feature template for carrying out feature extraction and object detection, so that it is possible to conduct more efficient template generation, more accurate feature extraction, and more reliable object detection.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general-purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Patent Application No. 201410386817.7 filed on Aug. 7, 2014, the entire contents of which are hereby incorporated by reference.

What is claimed is:

1. An image feature extraction method, comprising:
a definition step of defining a combination of at least two kinds of solid angles along at least two directions, of an input spherical image;
a determination step of determining respective values of the combination of the at least two kinds of solid angles, so that surface areas of spherical crowns of spherical segments, which are obtained by dividing the spherical image by the respective values of the combination of the at least two kinds of solid angles, having the same value; and
a generation step of generating, by utilizing the respective values of the combination of the at least two kinds of solid angles, an image feature template so as to conduct image feature extraction.

2. The method according to claim 1, further comprising:
a conversion step of converting a panoramic image so as to obtain the spherical image.

3. The method according to claim 2, wherein:
the panoramic image is an equirectangular image, and the equirectangular image is converted into the spherical image by utilizing $$r: [-\pi, \pi] \times [-\frac{\pi}{2}, \frac{\pi}{2}] \to R^2$$
$$(\lambda, \phi) \mapsto (\cos(\lambda)\cos(\phi), \sin(\lambda)\cos(\phi), \sin(\phi))$$

wherein, $\lambda$ stands for a degree of longitude of the equirectangular image; $\phi$ stands for a degree of latitude of the equirectangular image; r stands for mapping from the equirectangular image to the spherical image; and R stands for a radius of the spherical image.

4. The method according to claim 1, wherein:
the at least two directions of the combination of the at least two kinds of solid angles include at least two among directions along X, Y, and Z axes of the spherical image.

5. The method according to claim 4, wherein, the definition step includes:
utilizing $$\theta_x = 2\pi(1 - \cos(\arccos(\cos\phi\cos(\frac{\pi}{2} - \lambda)))) = 2\pi(1 - \cos\phi\sin\lambda) \in [0, 4\pi],$$

and $$\theta_z = 2\pi(1 - \cos(\frac{\pi}{2} - \phi)) = 2\pi(1 - \sin\phi) \in [0, 4\pi]$$

to define two kinds of solid angles,
wherein, $\theta_x$ refers to a kind of solid angle along the X axis; $\theta_z$ refers to another kind of solid angle along the Z axis; R refers to a radius of the spherical image; $\lambda$ refers to a degree of longitude of a panoramic image; and $\phi$ refers to a degree of latitude of a panoramic image.

6. The method according to claim 1, wherein, the determination step includes:
utilizing $$\theta(i) = \frac{2i^2}{N^2}\pi$$

to determine respective values of each kind of solid angle of the combination of the at least two kinds of solid angles on a semi-spherical surface, wherein, N stands for the number of spherical segments obtained by dividing the semi-spherical surface by the respective values of the corresponding kind of solid angle, $\theta(i)$ stands for an i-th value of the corresponding kind of solid angle, and i stands for a positive integer less than or equal to N; and
symmetrically expanding the respective values of each kind of solid angle of the combination of the at least two kinds of solid angles on a semi-spherical surface to the whole spherical surface.

7. The method according to claim 1, wherein:
the image feature template includes an integral image-based Haar feature template.

8. The method according to claim 6, wherein, the generation step includes:
utilizing $$ii(\theta_x, \theta_z) = \sum_{\theta'_x \leq \theta_x, \theta'_z \leq \theta_z} i(\theta'_x, \theta'_z)$$

to generate a spherical integral image to serve as the image feature template, wherein, $i(\theta'_x, \theta'_z)$ stands for a gray level of a spherical segment on the spherical image, defined by $\theta'_x$ and $\theta'_z$; $ii(\theta_x, \theta_z)$ stands for the spherical integral image; and $\theta'_x$ and $\theta'_z$ $$\begin{cases} \theta'_x(k) = \frac{2k^2}{N^2}\pi & (k=1,2,\ldots,N) \\ \theta'_z(k) = \frac{2k^2}{N^2}\pi & (k=1,2,\ldots,N) \end{cases}.$$

9. The method according to claim 1, further comprising:
a detection step of conducting object detection based on an extracted image feature.

10. An image feature extraction system, comprising:
a definition device configured to define a combination of at least two kinds of solid angles along at least two directions, of an input spherical image;
a determination device configured to determine respective values of the combination of the at least two kinds of solid angles, so that surface areas of spherical crowns of spherical segments, which are obtained by dividing the spherical image by the respective values of the combination of the at least two kinds of solid angles, having the same value; and
a generation device configured to generate, by utilizing the respective values of the combination of the at least two kinds of solid angles, an image feature template so as to conduct image feature extraction.

* * * * *